(12) United States Patent
Maximus

(10) Patent No.: US 7,033,027 B2
(45) Date of Patent: Apr. 25, 2006

(54) METHOD AND DEVICE FOR PROVIDING A SCROLLING ILLUMINATION

(75) Inventor: Bart Maximus, Oudenaarde (BE)

(73) Assignee: Barco N.V., Kortrijk (BE)

( * ) Notice: Subject to any disclaimer, the term of this patent is extended or adjusted under 35 U.S.C. 154(b) by 60 days.

(21) Appl. No.: 10/191,359

(22) Filed: Jul. 8, 2002

(65) Prior Publication Data

US 2003/0007134 A1    Jan. 9, 2003

(30) Foreign Application Priority Data

Jul. 6, 2001    (GB) .................................... 0116446

(51) Int. Cl.
*G03B 21/00*    (2006.01)

(52) U.S. Cl. ...................................................... 353/31

(58) Field of Classification Search ................. 359/245, 359/484, 485, 486, 487, 495, 496, 618, 629, 359/712, 722, 723, 885; 353/94, 98, 34, 353/70, 101

See application file for complete search history.

(56) References Cited

U.S. PATENT DOCUMENTS

| 5,517,340 | A | * | 5/1996 | Doany et al. .................. 349/5 |
| 5,898,521 | A | * | 4/1999 | Okada ........................ 359/487 |
| 5,984,478 | A | * | 11/1999 | Doany et al. ................. 353/84 |
| 6,005,722 | A | | 12/1999 | Butterworth et al. |
| 6,064,523 | A | | 5/2000 | Budd |
| 6,154,320 | A | * | 11/2000 | Itoh et al. ................... 359/629 |
| 6,203,160 | B1 | * | 3/2001 | Ho .............................. 353/84 |
| 6,217,173 | B1 | * | 4/2001 | Huang et al. ................. 353/20 |
| 6,243,149 | B1 | * | 6/2001 | Swanson et al. .............. 349/62 |
| 6,276,801 | B1 | * | 8/2001 | Fielding ...................... 353/31 |
| 6,646,806 | B1 | * | 11/2003 | Bierhuizen .................. 359/618 |

FOREIGN PATENT DOCUMENTS

EP    1081962 A2    7/2001

\* cited by examiner

*Primary Examiner*—Hung Xuan Dang
*Assistant Examiner*—Tuyen Tra
(74) *Attorney, Agent, or Firm*—Barnes & Thornburg LLP

(57) ABSTRACT

A display system comprises a light source (20) producing a beam of unpolarised light and a dynamic filter (28) for filtering said beam of light, wherein a first region of the filter (28) transmits along a first path a first portion of the beam of light having a first polarisation direction and reflects along a second path a second portion of the beam of light which has a second polarisation direction. The display system also provides a spatial light modulator (36) on the first path for receiving light travelling along the first path and selectively modulating that light to form an image light beam. A halve-wavelength retardation (60) of the second portion of the beam of light also is provided. The dynamic filter (28) makes polarised illumination move over the spatial light modulator (36). A corresponding method for providing a scrolling illumination is also provided.

28 Claims, 5 Drawing Sheets

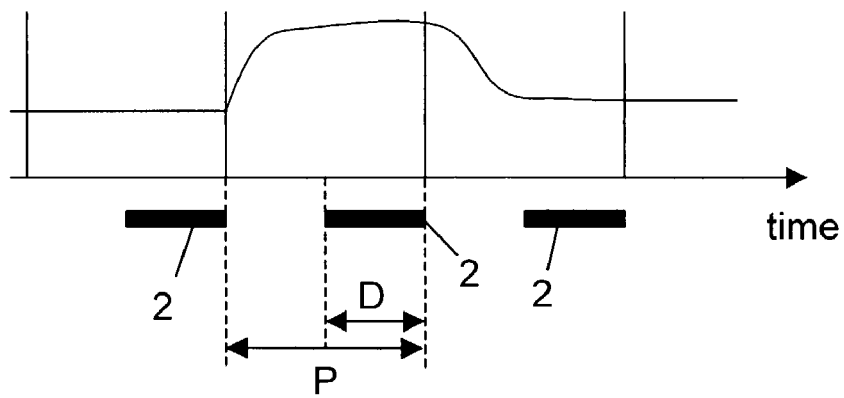
Fig. 1 - PRIOR ART
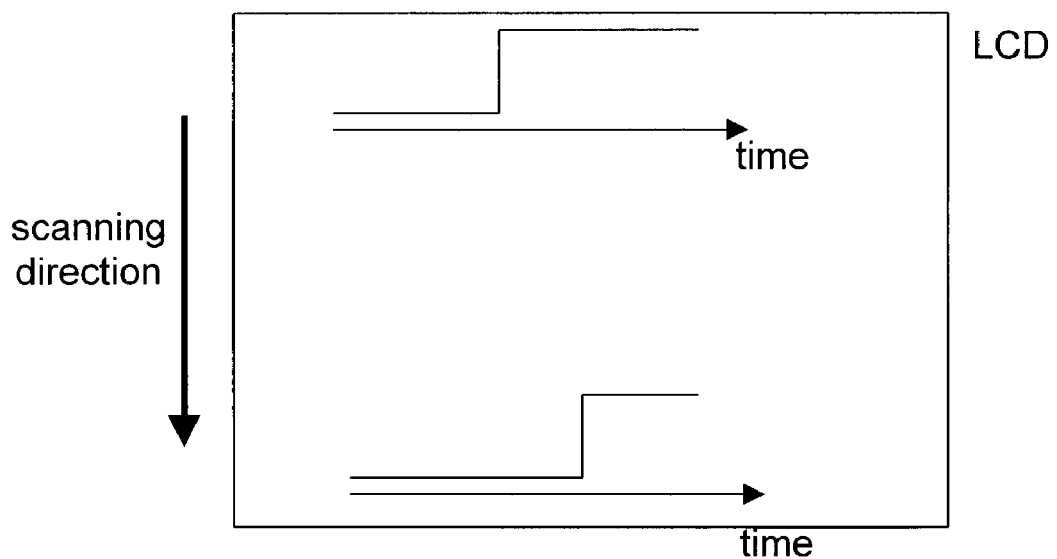
Fig. 2 - PRIOR ART

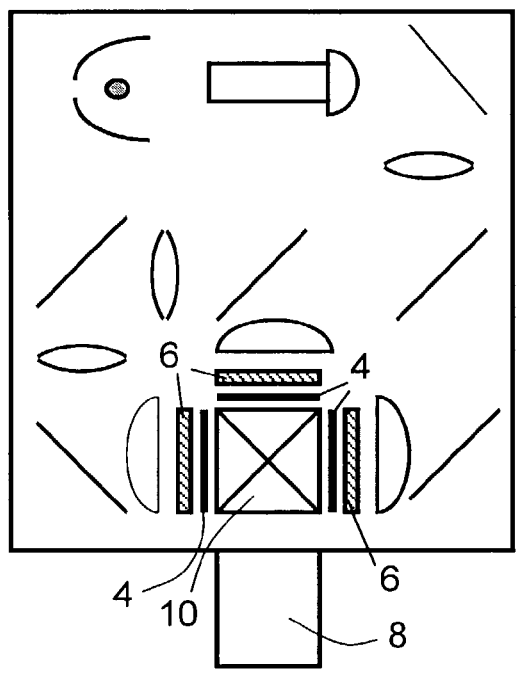
Fig. 3A - PRIOR ART
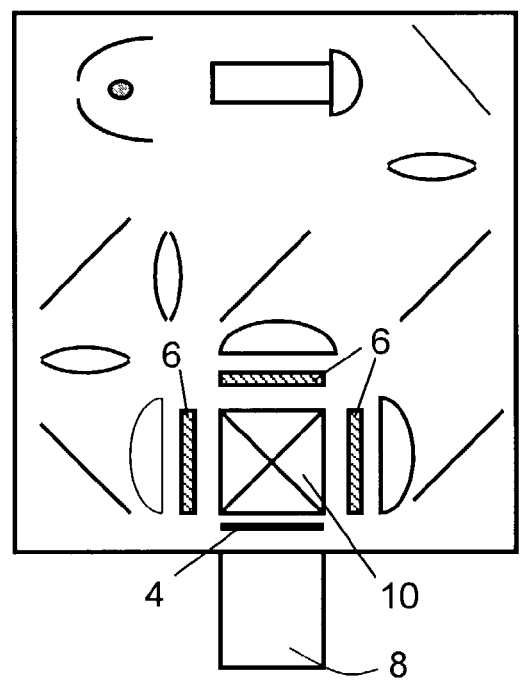
Fig. 3B - PRIOR ART

METHOD AND DEVICE FOR PROVIDING A SCROLLING ILLUMINATION

TECHNICAL FIELD OF THE INVENTION

The present invention relates to the field of display devices with one or more spatial light modulator panels, such as e.g. Digital Mirror Device, liquid crystal device (LCD) or liquid crystal on silicon (LCOS) devices. The spatial modulator panels may be monochromatic, full colour systems using a single light modulator panel (in which images of different colours are sequentially produced and imaged in rapid succession) or full colour systems using a multicolour-modulator system (in which images of different colours are produced simultaneously and combined with each other to form the full-colour image) are considered, e.g. three colours RGB. More particularly the present invention relates to image display apparatus and methods for improving the display of moving images.

BACKGROUND OF THE INVENTION

LCDs and LCOS display devices have a slow response time when switching from black to white or vice-versa, or from one grey level to another. This leads to a defocusing on moving objects, also known as smearing, as in conventional illumination of LCD panels (hold type) a lamp is always emitting light, also during switching of the modulator elements.

Jun-ichi Hirakata et al. describe in the article "Super-TFT-LCD for moving picture images with the blink backlight system", SID 01 Digest, p.990–993, a method to improve moving picture image quality by alternating light on and light off periods (impulsive type emission), and by synchronising those periods with switching periods of the modulator elements. As shown in FIG. 1, a LCD is only illuminated by a blinking backlight during illumination periods 2, i.e. when the LCD is almost switched to the desired value. The pulsating backlight illumination has to be synchronised to the LCD refresh rate (=1/frame time, i.e. typically 60 Hz). The illumination duty cycle (ratio of pulse duration D to the pulse period P) and the phase difference (shifting of the pulse periods with respect to the LCD refresh rate) can be optimised to obtain the lowest smearing at a lowest light loss. The best results are obtained when the scanning of the LCD is taken into account. The rows of an LCD are driven one by one, i.e. the top rows of the LCD start switching at the beginning of a frame, while the bottom rows of the LCD are switched at the end of the frame time, as shown in FIG. 2. Ideally, the phase of the pulsating illumination has to change from top to bottom of the LCD panel. In other words, the illumination should be scrolling over the panel with the same speed as the driving scan.

SEOS Displays Ltd. has demonstrated putting an extra modulator 4, e.g. a fast switching ferroelectric LCD, between each of the three LCDs 6 and the projection lens 8 in case of a three-modulator projector, as shown in FIG. 3A, or one switching modulator 4 in front of the projection lens 8, as shown in FIG. 3B. Such a modulator 4 allows light to pass during a part of the frame period only. This solution with the extra modulator(s) 4 gives similar results as the pulsed illumination solution discussed above, but it has some drawbacks. If the modulator 4 is not patterned, then a good matching over the complete image is not possible, because the LCD scan is not taken into account. Ideally, the modulator 4 should be driven from top to bottom, but this leads to a more complex driving circuit and a loss of light, because of the necessary patterning of the modulator 4, which makes the aperture ratio decrease. If the modulator 4 has to be close to focus, then three modulators are needed, one for every colour, as shown in FIG. 3A. If only one modulator 4 is used, as in FIG. 3B, then it can only be inserted after the colour recombination system 10, and therefor it is less focused, and thus not well matched with the scanning of the LCD or LCOS panel 6. Furthermore, the modulator 4 has to be flat and fast. In practice this is realised with a fast switching LCD plus an extra polariser, which leads to extra loss of light, on top of the duty cycle loss.

A sequential colour display system for creating a full colour image projected onto an image plane is known from EP-1098536. A dynamic filter such as a colour wheel generates a series of primary coloured light beams that are swept across the surface of a spatial light modulator. Light rejected by the dynamic filter is recycled and is reapplied to the dynamic filter. Typically all three primary colours are produced simultaneously by the dynamic filter. The illuminated portion of the dynamic filter is imaged onto the modulator and a controller provides appropriate image data for each portion of the modulator in synchronisation with the sweep of the primary colour bands across the modulator surface. The primary colour bands are modulated by the spatial light modulator and the modulated light is focused onto the image plane. The viewer integrates the light arriving at each portion of the image plane over a frame period to provide the perception of a full-colour image.

It is a disadvantage that e.g. LCD spatial light modulators used in the display system described above, have a polariser in front of it and an analyser behind it. When randomly polarised light passes through the front polariser it becomes linearly polarised. This means that light having one polarisation direction is transmitted by the polariser, and that light having the other polarisation direction is absorbed. The polariser thus absorbs a lot of heat, and thus the spatial light modulator suffers from a heat problem. Heating of the LCD panel leads to images with wrong colours or grey values.

SUMMARY OF THE INVENTION

It is an object of the present invention to provide a method and device for reducing smearing in display devices and projectors comprising a spatial light modulator such as LCD or LCOS modulator panels, while overcoming the disadvantages of the existing methods and devices for obtaining smearing suppression.

It is another object of the present invention to overcome the heating problem in existing spatial light modulator systems, e.g. LCD or LCOS display systems.

The above objective is accomplished by a method and device according to the present invention.

The present invention provides a method to modulate the illumination system so that spatial light modulator elements or picture elements of a spatial light modulator panel are only illuminated when the switching of those elements is substantially completed. The illumination does not illuminate all of the picture elements of a spatial light modulator panel, but only part of them, and means are provided to let this illuminated part traverse over the panel, e.g. scroll over the panel.

The present invention provides a display system comprising:
  a light source for producing a beam of unpolarised light,
  a dynamic light modulator for modulating said beam of light, a first region of said modulator directing a first portion of the beam of light which has a first polarisation direction, said light with the first polarisation direction travelling along a first path, and directing a second portion of the beam of light which has a second polarisation direction, said second portion of the beam of light travelling along a second path, a spatial light modulator on said first path for receiving light travelling along said first path and selectively modulating said light travelling along said first path to form an image light beam, and means for obtaining a halve-wavelength retardation of the second portion of the beam of light.

The dynamic modulator may be a filter, for example a filter comprising a second region for absorbing light falling onto it.

The dynamic modulator may furthermore comprise a second region for reflecting light falling onto it, the reflected light following the second path.

The display system according to the present invention may furthermore comprise a mirror on the second path. This mirror may have an aperture in it for allowing light from the light source to pass through.

The display system may furthermore comprise an integrator system in the first path for homogenising the beam of unpolarised light. The integrator system may comprise a lightpipe. Alternatively, the integrator system may comprise a set of lenses.

The dynamic light modulator may be a moving polarising wheel.

The means for obtaining a halve-wavelength retardation may be a quarter wavelength retarder intended to be passed through twice by the second portion of the light.

The display system may furthermore comprise splitting optics for splitting a polarised light beam into a plurality of light beams of different colour, and a recombination means for recombining the image light beams.

The present invention also provides a display system as any of the systems described above, wherein the spatial light modulator is intended to be driven according to a timing scheme, and wherein the display system furthermore comprises a controller for controlling the dynamic light modulator in synchronisation with the driving timing scheme of the spatial light modulator.

The present invention also provides the use of any of the display systems described above with an LCD projector or with an LCOS projector. The present invention furthermore comprises a method of producing an image, said method comprising the steps of:

providing a beam of unpolarised light, modulating said beam of unpolarised light by impinging it on a first region of a dynamic light modulator, said first region of said dynamic light modulator directing a first portion of the light with a first polarisation direction along a first light path and directing a second portion of the light not having the first polarisation direction to a second light path, modulating spatially said first portion of the light to form an image, whereby a portion of the beam of light is halfwave retarded.

The method may furthermore comprise a step of impinging the beam of unpolarised light on a second region of the dynamic light modulator, whereby the second region absorbs light falling onto it. Alternatively a method according to the present invention may comprise impinging the beam of unpolarised light on a second region of the dynamic light modulator, whereby the second region reflects light falling onto it.

A method according to the present invention may furthermore comprise a step of reflecting the rejected or reflected light.

The beam of unpolarised light may be homogenised. A portion of the beam of light may be quarter-wave retarded.

A method according to the present invention may furthermore comprise a step of controlling the dynamic light modulating step in synchronisation with the spatial light modulating step.

A control device for controlling the synchronisation between the driving of the dynamic light modulator and the switching of the picture elements of the modulator panel(s) is also provided.

The spatial light modulator panel may for example be an LCD or LCOS panel. It may be a monochromatic or a colour panel. It may be a reflective or a transmissive panel.

These and other features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1 is a graph of light intensity in function of time of different frames of one picture element, where blinking illumination according to the prior art is shown.

FIG. 2 shows the phase difference between different rows of one spatial light modulator panel according to the prior art.

FIG. 3A and FIG. 3B show embodiments of three-valve projectors where modulators are provided at different places in order to reduce smearing according to the prior art.

Figure 4:
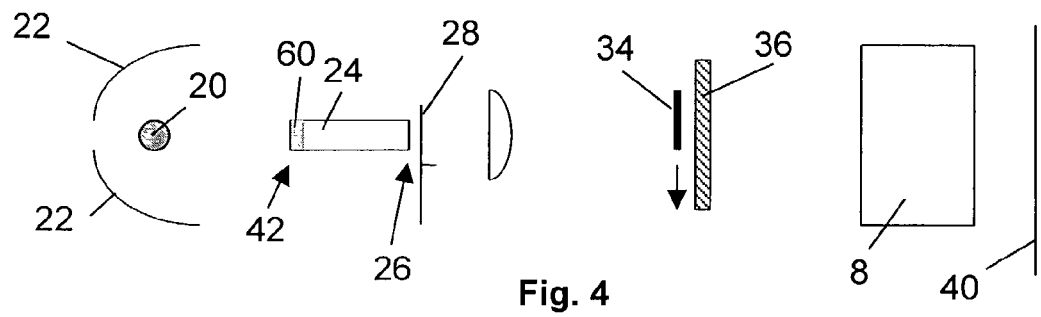
FIG. 4 schematically shows a display system provided with a polarisation wheel according to the present invention.

In the different figures, the same reference figures refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. In the following all references to a quarter wave retarder include also include odd multiples of a quarter wave retarder as is well know to the skilled person.

Spatial light modulators are known to the skilled person—see "Fundamentals of Photonics", B. E. A. Saleh and M. C. Teich, Wiley Series in Pure and Applied Optics, 1991. A spatial light modulator is a device which modulates the intensity of light at different positions by prescribed factors. Generally, it is a passive device and usually a planar optical element which can work in reflection or transmission. It has the function of controlling light intensity in reflection or transmission in accordance with a function of the position, i.e. F (x,y) of co-ordinates x, y in a Cartesian co-ordinate system. The intensity of the light at the output of the device is a function of the input might intensity I (x,y) and the modulation function F (x,y) namely, the output intensity O (x,y)=I (x,y). F (x,y). Generally, spatial light modulators can change the modulation function F (x,y) with time, i.e. they are controllable like a light valve for instance. Generally, for display purposes the input light is sensibly constant with time and the spatial light modulator modulates this light to project a still or moving picture, that is O (x,y,t)=I(x,y). F (x,y,t). Spatial light modulators may be electro-optical, but the present invention is not limited thereto, what is an electric signal is able to alter the function F (x,y,t) in time, e.g. the electric signal creates or induces an electric field or electric current which alters the property of a material or moves a mirror, for example.

One form of spatial modulator can be made from liquid crystals and is generally known as an LCD (Liquid Crystal display) or LCOS. The liquid crystal can be nematic, twisted nematic, ferrorelectric or similar. The LCD electro-optical elements co-operate with polarised light to vary the light intensity in transmission or reflection form more or less completely blocked to a high intensity determined by the absorption properties of the polarising filters used in the LCD.

Wave retarders, polarising filters and methods of creating and manipulating polarised light are known from the above mentioned book by B. E. A. Saleh and M. C. Teich.

Figure 8:
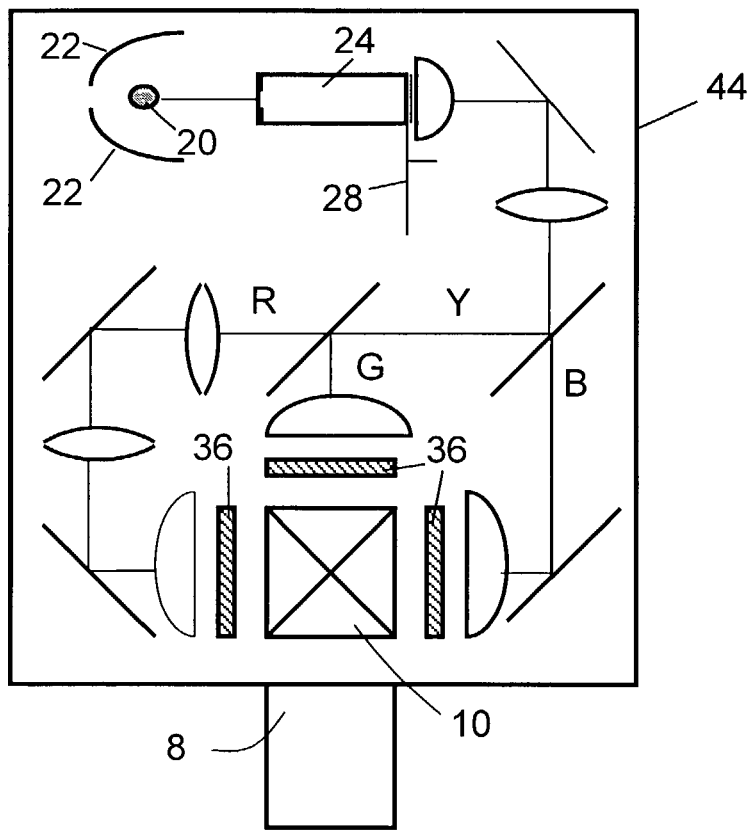
FIG. 8 is a schematic view of a three-modulator projector according to the present invention.
Figure 9:
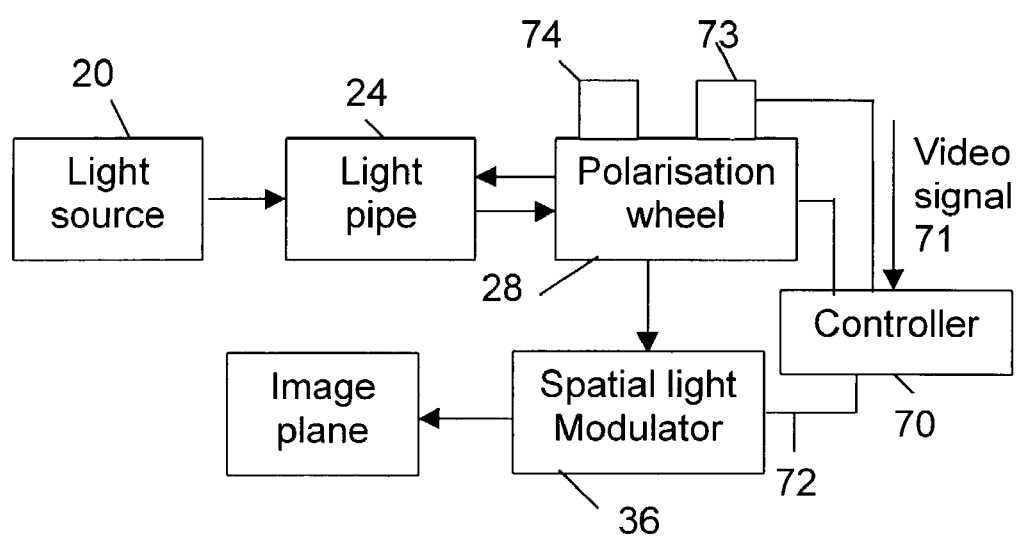
FIG. 9 is a block diagram of a display system according to the present invention.

An embodiment of the present invention is described with regard to FIG. 4, which is a schematic overview of one colour channel of a three-modulator projection device. A light source 20 provided with reflectors 22 emits an unpolarised light beam, which is sent to an optical circuit, e.g. a homogenising and mixing device such as a light pipe 24. The unpolarised light beam is converted, by reflection inside the mixing device 24, into a more uniform light beam. At the exit side 26 of the lightpipe 24, a dynamic filter such as a polarising wheel 28 is provided which comprises polarising parts 30 and light blocking parts 32. The polarising wheel 28 is intended to spin, so that light coming from the exit side 26 of the lightpipe 24, and impinging on the spinning wheel 28, generates a scrolling light beam 34 on a spatial light modulator panel 36 such as e.g. an LCD or LCOS panel. Between the polarising wheel 28 and the spatial light modulator panel 36, a colour splitting system, not represented in FIG. 4 but represented in FIG. 8, is provided. After the spatial light modulator panel 36, a colour recombination system, not represented in FIG. 4 but represented in FIG. 8, is provided, to send one combined light beam, containing image information, through a projection lens 8 towards an imaging plane 40.

Figure 5:
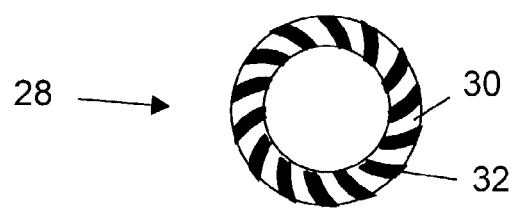
FIG. 5 illustrates a polarisation wheel with light blocking and light transmitting parts according to the present invention.

A front view of the polarising wheel 28 is shown in FIG. 5. The light blocking parts 32 of the polarising wheel 28 may either be light absorbing parts (black filters) or light reflecting parts such as mirrors. If the light blocking parts 32 are absorbing parts, the amount of light which reaches the image plane 40 is reduced, thus this solution is less light efficient and therefore less preferred. If the light blocking parts 32 are mirrors, the portion of the light beam falling in on the light blocking parts 32 is reflected back into the lightpipe 24, where it crosses the lightpipe 24 a second time. At the inside of the entrance side 42 of the lightpipe 24, a reflective area 52 around an aperture 50 is provided which reflects the portion of the light back towards the exit side 26 of the lightpipe 24. The aperture 50 allows light to enter the lightpipe 24. The larger the aperture 50, the more efficient the light collecting is, but the less efficient the light recuperation. The reflected light exits the lightpipe 24 at exit side 26 and gets a second chance to be transmitted by the polarising wheel 28.

Figure 7:
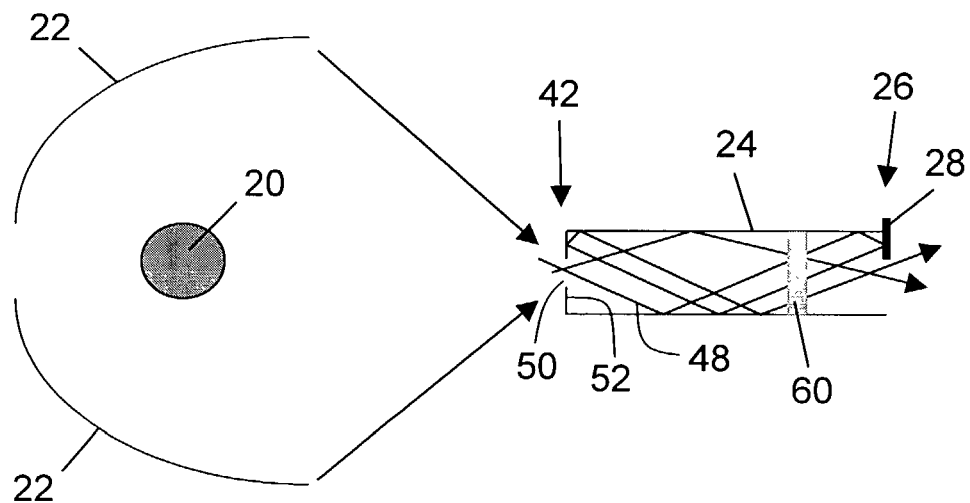
FIG. 7 shows a cross-section of a lightpipe in which light rays from a light source enter, some of which are transmitted through a light transmitting part of a polarisation wheel, and some of which are reflected by a light reflecting part of the polarisation wheel.

The light transmitting parts 30 of the wheel 28 are polarising parts, e.g. parts of a wiregrid polariser, or any other device that transmits one polarisation and reflects or absorbs the other, for transmitting light with a certain polarisation direction, and rejecting (absorbing or preferably reflecting) light not having that polarisation direction. Here again, the reflected light not having the right polarisation direction may be sent back into the lightpipe 24, from which it can be recuperated by reflection on the reflective area 52 at the inside of the entrance side 42 of the lightpipe 24. Somewhere in the lightpipe 24, means are provided for carrying out a quarterwave or odd multiple of a quarter wave retardation. For example, a quarterwave retarder or an odd multiple of a quarter wave retarder 60 may be provided, as shown in FIG. 7. Light rays reflected from the polarising wheel 28 pass through the quarterwave retarder 60, which converts the polarisation into circular polarisation, if the retarder is correctly orientated (i.e. under an angle of 45° with regard to the linear polarisation direction of the light). When the light is reflected by the mirrors 52 and is travelling back towards the polarising wheel 28, it again passes through the quarterwave retarder 60, and thus the polarisation is made linear again. In total, the polarisation direction of the rejected light has been turned over 90°, or thus the light has been switched from the unwanted into the wanted polarisation direction. The reflected light exits the lightpipe 24 and gets a second chance to be transmitted by the polarising wheel 28. If it impinges on a light transmitting part 30 of the polarising wheel 28, it will be transmitted, as it now has the wanted polarisation direction.

The effect of light passing through a quarterwave retarder 60 twice, is a halfwave retardation of the light.

If the light transmitting or polarising parts 30 of polarising wheel 28 absorb the portion of the light not having the right polarisation direction, then the polarising wheel 28 will absorb heat as much as the polarisers in the prior art devices. However, due to the spinning of the polarising wheel 28, it is easier to cool the polarising wheel. Therefore, a device according to the present invention suffers less from heating than prior art devices.

The presence of a quarterwave retarder 60 in the cross-section of the lightpipe 24 has no substantial effect on the polarisation state of the unpolarised light. The contribution of light with a polarisation state along and perpendicular to an axis of the reflective polariser is substantially the same before and after the quarterwave retarder 60.

Instead of a quarterwave retarder 60 somewhere in the cross-section of the lightpipe 24, as shown in FIG. 7, a quarterwave retarder may be fixed to the entrance area of the lightpipe and have a hole in it (not represented in the drawings), thus allowing light to enter the lightpipe. According to another embodiment (not represented in the drawings), a quarterwave retarder may be fixed to the entrance area of the lightpipe but have no hole in it. Unpolarised light falling through it will not be affected. In still another embodiment (not represented in the drawings) a quarterwave retarder may be positioned at the exit side of the lightpipe, just in front of the polarising wheel. In yet another embodiment (not represented in the drawings), instead of a quarterwave retarder, a distributed retarder is used, consisting of a plurality of retarders, for example two separate eighthwave retarders.

According to the present invention, illuminated stripes 34 are formed on the spatial light modulator panel 36 by light passing between two black filters or mirrors 32 on the polarising wheel 28, and those stripes 34 scroll over the spatial light modulator panel 36 when the polarising wheel 28 rotates. If colour splitting takes place in a projection device 44 as in FIG. 8, provided with a polarising wheel 28, the illumination scrolls synchronously over the panels 36 in the different colour channels B, G, R.

Figure 6:
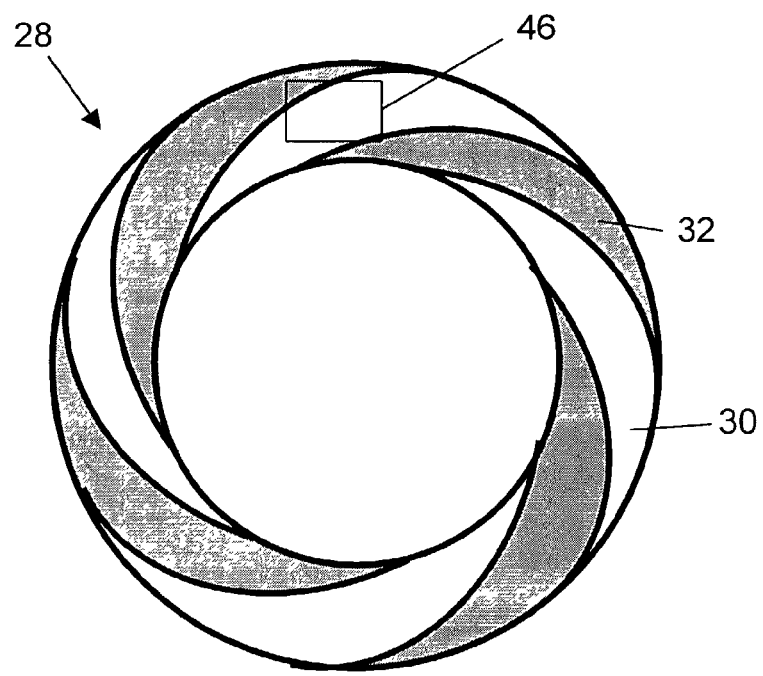
FIG. 6 shows a polarisation wheel with black or reflective parts and light transmitting parts, as well as an illumination area formed by the exit surface of a lightpipe.

The illumination area 46 (shown in FIG. 6) formed by the exit surface 26 of the lightpipe 24, does not need to be completely rectangular. Furthermore, the segments 30, 32 are smaller than the illumination area 46 at the exit side 26 of the lightpipe 24. That way, always a part of the modulator panel 36 is illuminated, and a part thereof is dark, which enables switching of the picture elements.

The lightpipe 24 can be any suitable lightpipe. It is not anticipated that the form of the lightpipe has a material effect on the present invention. The lightpipe can be, for example, a hollow enclosure with reflective inner sides, or it can be a solid glass rod, where the reflections to the side surfaces are based on internal reflection of light with a large incident angle. The mirror 52 with the aperture 50 can be glued to the entrance side 42 of the lightpipe 24 or can be positioned very close to it. The quarterwave retarder 60, or any other retarder, can be sandwiched between the glass rod and the mirror 52 at the entrance side 42 or at the exit side 26 of the glass rod.

The exit side 26 of lightpipe 24 is preferably located very close to the polarising wheel 28 to ensure that light reflected by the polarising wheel 28 is recaptured by the lightpipe 24.

FIG. 7 shows light rays 48 produced by the lamp 20 and entering the lightpipe 24 through the aperture 50 in the mirror 52 at the entrance side 42 of the lightpipe 24. Some of those light rays are reflected by mirrors or reflective filters 32 at the polarising wheel 28 at the exit side 26 of the lightpipe 24, and they are reflected back into the lightpipe 24. Some of the light rays impinge on polarising parts 30 at the polarising wheel 28, and they are partially transmitted and preferably partially reflected, depending on their polarisation direction. If the reflected light rays arrive at the front side 42 of the lightpipe 24, there is an area outside the aperture 50 (typically a substantially circular area in the entrance surface of the lightpipe 24 which enables the light from the lamp 20 and reflector 22 to enter the light pipe 24.) where mirrors 52 are placed. If a light ray falls onto that area, it gets a second pass through the lightpipe 24 and a new chance to get passed the spinning wheel 28. Polarised light which had a polarisation direction not corresponding to the polarisation direction allowed to be transmitted by the polarising parts 30, has changed polarisation direction by the halfwave retardation in the lightpipe 24.

The process continues until the light is accepted by the spinning wheel 28, absorbed by the lightpipe 24 or escapes the lightpipe 24. The light recuperation is not 100% because of the aperture 50, but a 37% gain in optical efficiency may be obtained. About 50% of the light is lost by the wheel 28, 37% thereof can be recuperated by a mirror 52 at the entrance side 42 of the light pipe 24.

A display system according to the present invention is provided with means for synchronising the rotation of the polarising wheel 28 (and thus the scrolling of the illumination over the spatial light modulator panel 36) and the switching of the picture elements in the spatial light modulator panels 36. There is a relationship between the location of the black or mirroring parts 32 on the wheel 28 at any time and the driving time of the modulator panel 36.

A controller 70 receives a video signal 71 and sends corresponding image data 72 to the spatial modulator panel 36. At the same time, the controller 70 controls the rotation of the polarising wheel 28 so as to synchronise the rotation of the polarising wheel 28 with the timing of the switching of the picture elements in the spatial light modulator planes 36. For example, image data representing the top part of the image may be sent during the period in which the illumination beam scrolls over the bottom part of the spatial modulator panel(s) 36, image data representing the middle part of the image may be sent during the period in which the illumination beam scrolls over the top part of the spatial modulator panel(s) 36, and image data representing the bottom part of the image may be sent during the period in which the illumination beam scrolls over the middle part of the spatial modulator panel(s) 36. The position of the rotating polarising wheel 28 may be recorded by means of an encoder such as an optical encoder 73 associated with an axis about which the polarising wheel 28 rotates. The signal from the encoder 73 which is preferably an electrical signal and may be either an analog or digital signal is supplied to the controller 70. The motor 74 driving the polarising wheel 28 may have a feedback circuit (not represented in the drawings) which allows the rotation of the motor 74 to be set to a particular value at any moment of time, e.g. a DC synchromotor. A signal 72 provided by the controller 70 related to the switching time of the picture elements may then be provided by the controller 70 to the motor 74 so that the polariser wheel 28 rotates in synchronisation with the operation of the picture elements. Alternatively, an open loop control system may be used, e.g. the drive motor of the polarising wheel may be a stepping motor which can be driven to an exact position based on the number of steps. Then the controller provides signals to the motor which make it move to a specific location at a specific time so as to synchronise the polarising wheel with the operation of the picture elements. Alternatively, a signal from the polarising wheel, e.g. from an encoder, may be supplied to the controller, and the operation of the picture elements is synchronised to the rotation of the wheel. This may be done in an open loop or closed loop manner.

While the invention has been shown and described with reference to preferred embodiments, it will be understood by those skilled in the art that various changes or modifications in form and detail may be made without departing from the scope and spirit of this invention. For example, the spinning wheel shown in the drawings, more particularly in FIG. 5 and FIG. 6, comprises transmitting and light blocking regions, the boundaries of which form a "Spiral of Archimedes"; i.e. the boundaries are defined by $$r = a\Theta$$

where r is the radius or distance of the boundary to the centre, a is a constant, and $\Theta$ defines an arc between the boundary and a reference, whereby a different reference is used for each boundary between light transmitting and light blocking parts of the wheel. However, instead of boundaries which form a "Spiral of Archimedes", also other boundaries can be used, such as e.g. radial boundaries.

Furthermore, the embodiment described comprises a lightpipe. However, although this is the preferred embodiment, the presence of a lightpipe is not necessary for the present invention.

The invention claimed is:

1. A display system comprising:
   a light source for producing a beam of unpolarised light,
   a dynamic light modulator for dynamically modulating said beam of light with respect to polarisation, a first region of said modulator directing a first portion of the beam of light which has a first polarisation direction, said light with the first polarisation direction travelling along a first path, and rejecting a second portion of the beam of light not having the first polarisation direction, and
   a spatial light modulator on said first path for receiving light travelling along said first path and selectively modulating said light travelling along said first path to form an image light beam,
   wherein
   the dynamic light modulator is adapted as to, in operation, always illuminate only a part of the spatial light modulator on said first path, whereby the illuminated part scrolls over the spatial light modulator on said first path.

2. A display system according to claim 1, wherein rejecting a second portion of the beam of light comprises reflecting said second portion of the beam of light along a second path.

3. A display system according to claim 2, wherein the dynamic modulator furthermore comprises a second region for reflecting light falling onto it, the reflected light following the second path.

4. A display system according to claim 2, furthermore comprising a mirror on the second path.

5. A display system according to claim 4, wherein the mirror has an aperture in it for allowing light from the light source to pass through.

6. A display system according to claim 2, wherein said display system furthermore comprises a means for obtaining a half-wavelength retardation of the second portion of the beam of light along said second light path.

7. A display system according to claim 6, wherein the means for obtaining a halve-wavelength retardation is a quarter wavelength retarder intended to be passed through twice by the second portion of the light.

8. A display system according to claim 1, wherein the dynamic modulator is a filter.

9. A display system according to claim 8, wherein the filter furthermore comprises a second region for absorbing light falling onto it.

10. A display system according to claim 1, furthermore comprising an integrator system in the first path for homogenising the beam of unpolarised light.

11. A display system according to claim 10, wherein the integrator system comprises a lightpipe.

12. A display system according to claim 10, wherein the integrator system comprises a set of lenses.

13. A display system according to claim 1, wherein said dynamic light modulator is a moving polarising wheel.

14. A display system according to claim 1, furthermore comprising splitting optics for splitting a polarised light beam into a plurality of light beams of different colour, and a recombination means for recombining the image light beams.

15. A display system according to claim 1, the spatial light modulator being intended to be driven according to a timing scheme, the display system furthermore comprising a controller for controlling the dynamic light modulator in synchronisation with the driving timing scheme of the spatial light modulator.

16. A display system according to claim 15, the spatial light modulator comprising a plurality of picture elements, wherein the controller is adapted for switching picture elements corresponding with a first part of said spatial light modulator during the period in which another part of the spatial light modulator is illuminated.

17. The display system of claim 1 having an LCD or LCOS projector.

18. A display system according to claim 1, wherein said illuminated part comprises illuminated stripes.

19. A method of producing an image, said method comprising the steps of:
   providing a beam of unpolarised light,
   dynamically modulating said beam of unpolarised light with respect to polarisation by impinging it on a first region of a dynamic light modulator, said first region of said dynamic light modulator directing a first portion of the light with a first polarisation direction along a first light path and rejecting a second portion of the light not having the first polarisation direction, and
   modulating spatially said first portion of the light to form an image using a spatial light modulator on said first light path,
   wherein said dynamically modulating is adapted as to, in operation, always illuminate only a part of the spatial light modulator on said first light path, whereby the illuminated part scrolls over the spatial light modulator on said first light path.

20. A method according to claim 19, wherein said rejecting a second portion of the light comprises reflecting said second portion of the light to a second light path.

21. A method according to claim 20, furthermore comprising impinging the beam of unpolarised light on a second region of the dynamic light modulator, said second region reflecting light falling onto it to a second light path.

22. A method according to claim 20, furthermore comprising a step of reflecting the light travelling on the second light path.

23. A method according to claim 20, the method furthermore comprising halfwave retarding the second portion of the light along said second light path.

24. A method according to claim 23, wherein said halfwave retarding comprises a step of quarter-wave retarding a portion of the beam of light.

25. A method according to claim 19, furthermore comprising impinging the beam of unpolarised light on a second region of the dynamic light modulator, said second region absorbing light falling onto it.

26. A method according to claim 19, furthermore comprising homogenising the beam of unpolarised light.

27. A method according to claim 19, furthermore controlling the dynamic light modulating step in synchronisation with the spatial light modulating step.

28. A method according to claim 27, wherein said controlling comprises switching picture elements corresponding with a first part of said spatial light modulator during the period in which another part of the spatial light modulator is illuminated.

* * * * *